INVENTOR.
ABRAHAM KATZ
BY Morris L. Rabkin
ATTORNEY

Sept. 15, 1959 A. KATZ 2,904,781

MONITORING CIRCUITS

Filed Feb. 15, 1957 2 Sheets-Sheet 2

INVENTOR.
ABRAHAM KATZ
BY Morris L. Rabkin
ATTORNEY

2,904,781

MONITORING CIRCUITS

Abraham Katz, Haddonfield, N.J., assignor to Radio Corporation of America, a corporation of Delaware Application February 15, 1957, Serial No. 640,488

10 Claims. (Cl. 340—174)

This invention relates to monitoring circuits, and particularly to circuits for monitoring the operation of magnetic core arrays.

Certain magnetic systems include arrays of magnetic cores arranged in coordinate groupings. In memory and in switching applications, desired ones of the cores are selected by applying suitable excitations to the coordinate lines linked to the desired cores.

It is an object of the present invention to provide a monitoring circuit for determining when, and only when, a desired one, and not others, of the coordinate lines are selected.

Another object of the present invention is to provide a monitoring circuit which provides an indication when undesired ones of the coordinate lines are selected.

Still another object of the present invention is to provide a monitoring circuit which is relatively simple in construction and efficient in operation for monitoring a magnetic core array.

According to the present invention, the array lines are coupled to a monitoring circuit having a separate magnetic core for each array line and having a pair of sensing windings each linking different groups of the monitor cores according to a desired combinatorial arrangement. One embodiment of the invention includes a sensing winding linked to that group of monitor cores linked by those array lines identified by address numbers containing an odd number of binary "1" digits, and another sensing winding linked to that group of monitor cores linked by those array lines identified by address numbers containing an even number of binary "1" digits.

When any one array line is selected, the monitor core coupled to that line has its remanent state changed, thereby inducing an output signal in one or the other of the sensing windings. The pair of sensing windings are coupled to a check circuit which operates to provide an output signal only when one of the sensing windings receives a signal. When neither, or when both, sensing windings receive signals, the check circuit provides an alarm signal.

Figure 1:
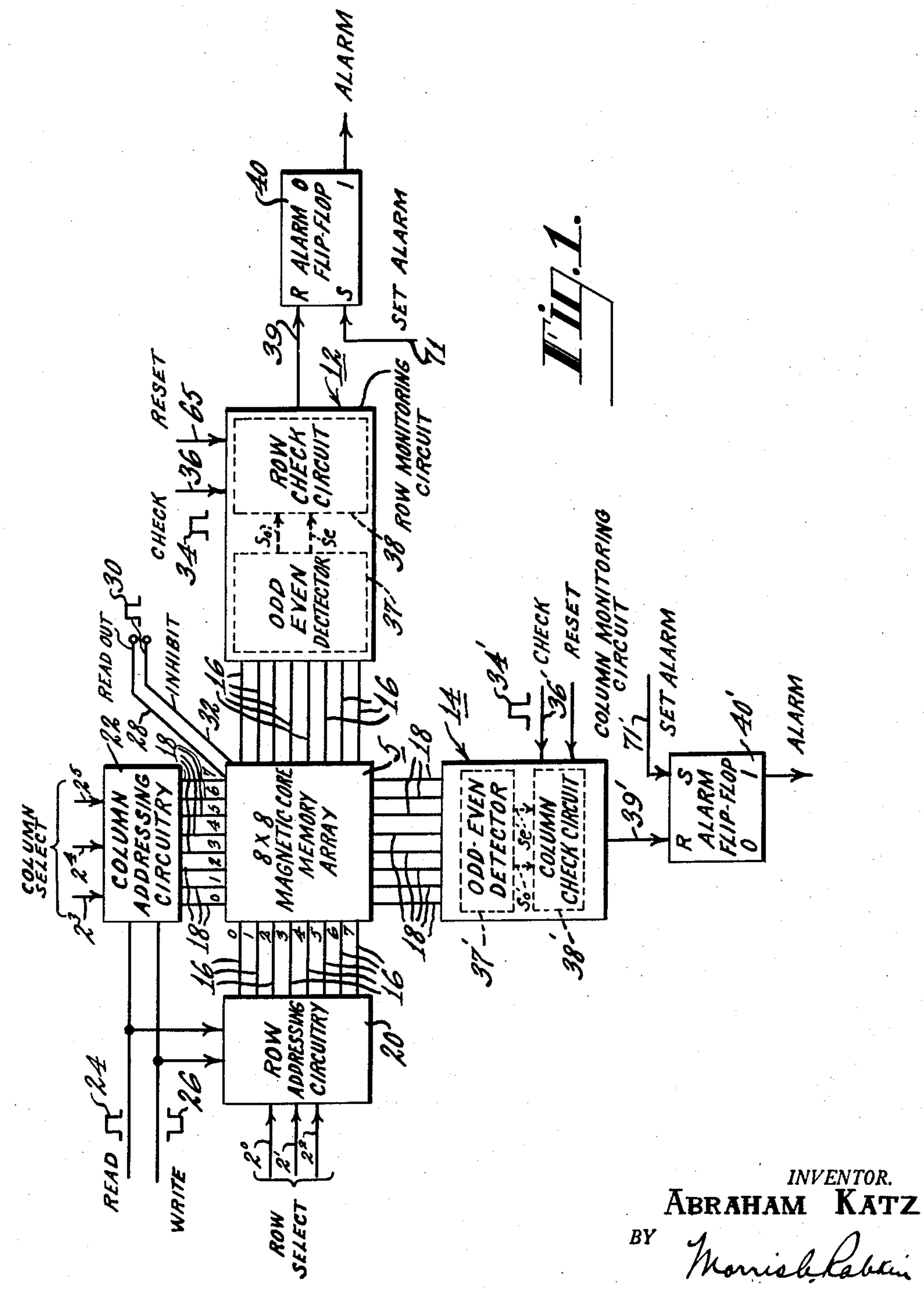
Figure 2:
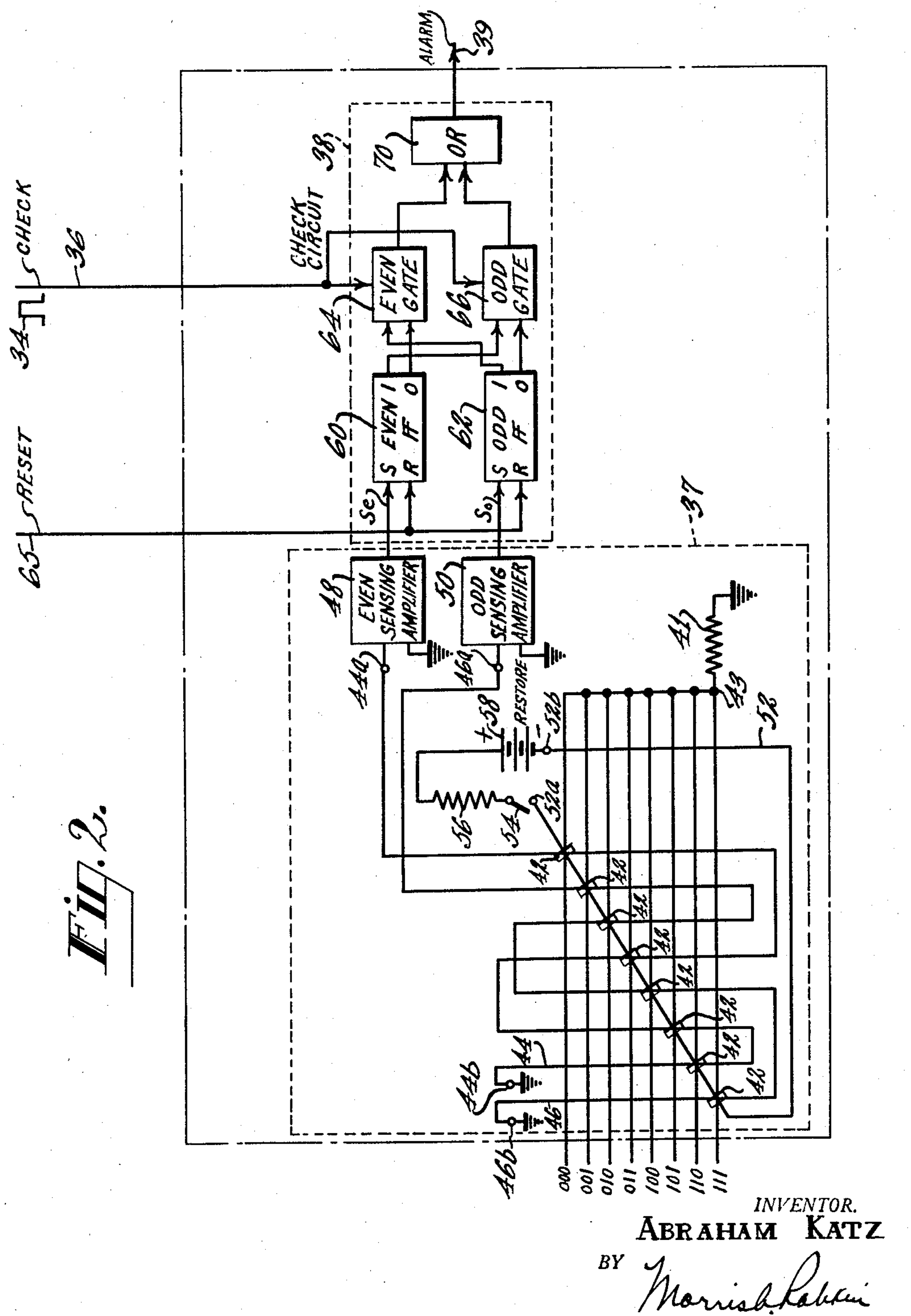

In the accompanying drawings:

Fig. 1 is a schematic diagram of a two-dimensional memory system embodying the invention, and Fig. 2 is a schematic diagram of a monitoring circuit of Fig. 1.

The memory system of Fig. 1, except for the row and the column monitoring circuits 12 and 14, may be one known in the art. For example, the system may be that described in an article by William N. Papian, entitled "New Ferrite-Core Memory Uses Pulse Transformers," published in the March 1955 issue of Electronics, pp. 194–197, having seventeen 64 x 64 arrays of magnetic cores. The two-dimensional memory system shown in Fig. 1 herein is on a smaller scale than that described in the Papian article and corresponds to an 8 x 8 portion of any one of the 64 x 64 arrays thereof. A desired one of the cores of the 8 x 8 memory array 5 of Fig. 1 is selected by activating that one of the row lines 16 and that one of the column lines 18 intersecting at the desired core. The selection of the one row line 16 is determined by a row address number having three binary digits respectively of orders $2^0$, $2^1$ and $2^2$. The selection of the one column line 18 is determined by a column address number having three binary digits respectively of orders $2^3$, $2^4$ and $2^5$. The row and column addressing circuitry 20 and 22 each includes decoding and gating circuitry for controlling the application of read pulses to the selected row and column lines 16 and 18. Also, there are provided readout coil 28 coupled to all the cores of the array 5, and an inhibit coil 32 coupled to all of the cores of the array 5.

The operation of the memory system, with respect to the components thus far described, is similar to that described in the aforesaid Papian article. Thus, each memory cycle is divided into two portions, "read" and "write." During the read operation, a positive read pulse 24 is applied concurrently to the selected row and column lines 16 and 18 to magnetize the desired core to one of its two directions of magnetization. During the application of the read pulse 24, output signals are induced in the readout winding 28, coupled to all the cores of the memory array 5. One binary digit is indicated by a relatively large output signal on the readout winding 28, and the other binary digit is indicated by a relatively small or no output signal on the readout winding 28. During the write operation, a negative write pulse 26 is applied concurrently to the selected row and column windings 16 and 18. One of the binary digits is written into the desired memory core by applying concurrently with the negative write pulse a positive-polarity inhibit pulse 30 to the inhibit winding 32. The other binary digit is written into the desired memory core by omitting the inhibit pulse 30.

Accordingly, during a correct cycle of memory operation, a positive read pulse 24 and a negative write pulse 26 flow successively in one selected row line 16 and in one selected column line 18 of the memory array 5. During faulty operation of the memory system, such as failure of some element of the addressing circuitry, the read or the write pulses 24 and 26 are not applied at all, or are applied to more than one of the row or column lines 16 or 18. The failure of an element in the addressing circuitry, unless it is immediately detected, results in the destruction of stored information and the insertion of incorrect information into the memory array. However, according to the invention, there are provided a row monitoring circuit 12 and a column monitoring circuit 14. Both the row and the column monitoring circuits 12 and 14 are similar to each other and only the row monitoring circuit 12 will be described in detail. The row monitoring circuit 12 has a detector circuit 37 and a check circuit 38. When a row array line 16 is properly selected, the odd-even detector circuit 37 provides one of the two output signals *So* or *Se* in response to the write pulse 26. Either one of the detector output signals *So* or *Se* prevents the check circuit 38 from producing an alarm signal on its alarm output 39 in response to a later applied check pulse 34. If more than one row line 16 is selected, the detector 37 provides both output signals *Se* and *So* and the check circuit 38 provides an alarm output in response to the check pulse 34. Also, if none of the row lines 16 is selected, neither of output signals *Se* nor *So* is produced by the detector circuit 37, and an alarm output is again provided when the check pulse 34 is applied.

Fig. 2 is a schematic diagram of the row monitoring circuit 12. Each of the row lines 16 links a different one of the monitor cores 42 by one or more turns. For convenience of drawing, however, only a single turn is shown. Each of the magnetic cores 42 may be similar to any one of the memory cores used in the memory arrays of Fig. 1. After linking the monitor cores 42, all of the row lines 16 are connected at a junction 43. A common resistance element 41 is connected between the junction 43 and a point of reference potential, indicated in the drawing by the conventional ground symbol. A first sensing winding 44 links all the cores 42 that are linked by those of the row lines 16 that have an even number of binary "1" digits in their respective identifying adress numbers. The binary address numbers for the row lines 16 are indicated in the drawing. A second sensing winding 46 links all the remaining ones of the cores 42, that is, those having an odd number of binary "1" digits in their respective identifying address numbers. The first sensing line 44 is connected at one end terminal 44*a* to the input of a sensing amplifier 48. The second sensing winding 46 is connected at one end terminal 46*a* to the intput of a second sensing amplifier 50. The sensing amplifiers 48 and 50 are designated "even" and "odd," respectively. The other terminals 44*b* and 46*b* of the sensing windings are each connected to the common ground. A restore winding 52 links all the cores 42 of the detector 37. One end terminal 52*a* of the restore winding 52 is connected to the fixed terminal of a single-pole, single-throw restore switch 54. The restore switch 54 has its movable arm connected in series with current-limiting resistor 56 to the positive terminal of a voltage source, such as a battery 58. The negative terminal of the battery 58 is connected to the other end terminal 52*b* of the restore winding 52.

The outputs of the even and odd sensing amplifiers 48 and 50 are connected respectively to the set inputs (S) of two flip-flops 60 and 62 of the row check circuit 38. A reset line 65 of the check circuit 38 is connected to the reset inputs (R) of both check flip-flops 60 and 62. The two flip-flops 60 and 62 are designated "even" and "odd," respectively. The "0" output of the even and the "1" output of the odd check flip-flops 60 and 62 are connected to two inputs of a three-input "and" gate 64, termed the "even" gate; the "1" output of the even, and the "0" output of the odd check flip-flops 60 and 62 are connected to two inputs of a three-input "and" gate 66, termed the "odd" gate. The third inputs of both "and" gates 64 and 66 are connected to a check line 36 which receives check pulses 34. The outputs of the even and odd check "and" gates 64 and 66 are connected respectively to the inputs of a two-input "or" circuit 70 whose output is connected to the alarm output 39 of the row monitoring circuit 12.

At the start of each memory cycle, each monitor core is magnetized in an initial one of its two remanent states, and the even and odd check flip-flops are in their reset conditions. Also, the alarm flip-flops 40 and 40' are placed in their set conditions by applying a set signal to the set alarm leads 71 and 71' connected to their set inputs "S." In the set condition, the "1" output of any flip-flop is high relative to its "0" output while, in the reset condition, its "0" output is high relative to its "1" output. When a positive read current pulse 24 flows through a selected row line 16, the monitor core 42 (Fig. 2) coupled by that selected row line 16 has its remanent state changed from the initial state to the other state. The flux change in that monitor core 42 induces an output voltage of one polarity in the coupled one of the sensing windings 44 or 46. However, the even and the odd sensing amplifiers 48 and 50 are arranged so that they do not respond to the one-polarity output voltage induced in the one of the sensing windings 44 and 46 during a read operation. Any suitable known sensing amplifier circuit may be employed.

During the write portion of the memory cycle, the negative write current pulse 26 flowing in the selected row line 16 returns the previously changed monitor core 42 from its other to its initial remanent state, thereby inducing an opposite-polarity voltage in the coupled one of the sensing windings 44 and 46. That even or odd sensing amplifier 48 or 50 coupled to this one sensing winding 44 or 46 responds to the opposite-polarity voltage by producing an output signal to set the corresponding one of the even or the odd flip-flops 60 and 62. Accordingly, one of the even or odd flip-flops 60 or 62 is changed from its reset to its set condition. Thus, the corresponding one of the even and the odd "and" gates 64 and 66 is enabled at two of its three inputs, while the other of the even and odd "and" gates 64 and 66 is not enabled at any of its inputs. After the write portion of the memory cycle is terminated, a check pulse 34 is applied to the check line 36 and is passed by the enabled one of the even and odd "and" gates 64 and 66 to the input of the "or" circuit 70. The "or" circuit 70 responds to a signal appearing at either one of its inputs by producing an output on the output lead 39 of the row check circuit 12. The alarm output 39 is used in a "fail-safe" manner to reset the alarm flip-flop 40 which was placed in its set condition at the start of the memory cycle. After the check pulse 34 is terminated, a reset signal is applied to the reset line 65 to return the even and the odd flip-flops 60 and 62 to their reset conditions. Accordingly, after a correctly executed memory cycle, the monitor cores 42 are all in their initial remanent states, the check circuit flip-flops are all in their reset conditions, and the external alarm flip-flop 40 is in its reset condition. The column monitoring circuit 14 operates in a similar manner.

A relatively common failure in certain memory systems is to simultaneously select two row lines 16, one of which has an even number of binary "1" digits and the other of which has an odd number of binary digits in its address number. For example, such improper selection may be due to the failure of a crystal diode in the decoding portion of the decoding circuitry. Assume, now, that more than one of the row lines 16 is selected during a memory cycle. In such case, more than one of the monitor cores 42 of the row detector 37 have their remanent states changed. Accordingly, during the write portion of the memory cycle, voltages are induced in both the even and the odd sensing windings 44 and 46. Both the even and the odd sensing amplifiers 48 and 50 respond to the induced voltages by producing output signals to set both the even and the odd flip-flops 60 and 62. Accordingly, each of the even and the odd "and" gates 64 and 66 is enabled at only one of its three inputs. Accordingly, when a check pulse 34 is subsequently applied, neither of the even and odd "and" gates 64 and 66 responds, and no output signal is produced on the alarm output 39. The external alarm flip-flop 40, therefore, remains in its set condition, and the relatively high "1" output thereof indicates a faulty memory operation.

If none of the row lines 16 is selected, then none of the monitor cores 42 has its remanent state changed. Accordingly, both of the even and the odd flip-flops 60 and 62 remain in their reset condition, and neither of the even and odd "and" gates 64 and 66 is enabled. Therefore, the check pulse 34 is again blocked from the alarm output lead 39, thereby indicating faulty memory operation.

It should be noted that the monitoring circuit of the present invention does not detect the faulty selection of two row lines 16 both of which have even numbers of binary "1" digits in their address numbers, or both of which have odd numbers of binary "1" digits in their address numbers. However, the latter type of failure is highly unusual in practice.

The monitoring circuits of the present invention also provide an error indication when only the write portion of the memory cycle fails. Thus, the monitor core 42 that was changed during the read portion of the memory cycle remains in its other remanent state. Accordingly, both of the even and the odd flip-flops 60 and 62 remain in their reset conditions, and the check signal 34 is blocked by the even and the odd "and" gates 64 and 66. When the fault has been corrected, the restore switch 54 (Fig. 2) may be momentarily closed, then opened, to produce a current pulse in the restore coil 52. The restore current changes any monitor core 42 to its initial remanent state.

The monitoring circuits of the present invention can be used to advantage in magnetic switching core arrangements. In certain arrangements where D.C. (direct current) biased switches are employed, the monitor circuits may be arranged and operated in a manner similar to that just described, except that a restore pulse is applied to the restore winding 52 during every cycle to take the place of the negative polarity write pulse of the memory system. For example, in D.C. biased switches, each switch core is linked by array lines and by a separate output winding. The switch cores may be arranged in rows and columns with each switch core being linked by a different row and a different column line. A row monitoring circuit is connected to the row array lines, and a column monitoring circuit is connected to the column array lines. Thus, the arrangement of the D.C. biased switch, except for the additional restore signal, is the same as that of the memory array of Fig. 1.

A desired switch core is selected by activating the row and the column array lines linked thereto. At this time, the selected switch core produces an output of one polarity on its separate output winding. The row and the column selecting currents also change the remanent states of the row and column monitor cores, as in the memory system described above.

Upon termination of the selecting currents, the D.C. bias automatically returns the selected switch core to its initial direction of magnetization. At this time, an output of opposite polarity is produced on the separate output winding of the selected switch core. However, each of the array lines of the switch is open-circuited when the D.C. bias is restoring the selected switch core. Accordingly, an additional restore pulse is applied to the row and column monitor cores to return the changed monitor cores to their initial remanent states. The changed monitor cores produce the detector output signals which control the alarm output of the monitor circuit. Otherwise, the operation of the monitor circuits of the invention is the same whether they are used to monitor the operation of a magnetic memory array or a magnetic switch array. Other known types of magnetic core switching arrays may be monitored in similar fashion.

There have been described herein improved monitoring circuits for checking the operation of a magnetic core array. By providing an additional monitor core for each array line, and by segregating the monitor cores into two separate groups according to a desired combinatorial arrangement, all single failures of addressing channel elements are detected. By "addressing channel" is meant the channel through which an addressing signal controls the selection of a desired array line. Likewise, any single failure occurring during only one of the portions of a memory cycle is detected.

The monitoring circuits described herein effectively provide the advantages of the conventional odd-even parity check, although a separate parity check digit is not involved.

Certain double failures of addressing channel elements can be detected by modifying the detector and check circuit portions of the monitoring circuit. The detector circuit modification comprises connecting the even sensing winding 44 (Fig. 2) in series with the odd sensing winding 46, eliminating one of the sensing amplifiers 48 and 50, and using a conventional full-wave rectifying-type sensing amplifier responsive to both polarity signals for the other of the sensing amplifiers 48 and 50. For example, the terminals **44*b* and 46*b*** of the sensing windings

44 and 46 are disconnected from ground and are connected to each other; the terminal **46*a* of the sensing winding 46 is disconnected from the odd sensing amplifier 50 and connected to ground. A full-wave rectifying-type sensing amplifier is used for the even sensing amplifier 48. When only one row line 16 is activated during a memory cycle, a single monitor core 42 is driven, and a single voltage pulse of one or the other polarity is induced in the series-connected sensing windings 44 and 46. The sensing amplifier 50 responds to this induced pulse by providing an output. If both an odd and an even-numbered row line 16 are activated during a memory cycle, two monitor cores 42 are driven. The two driven monitor cores 42 induce equal cancelling voltages in the series-connected sensing windings 44 and 46, and no output is provided by the sensing amplifier 50**.

The modification to the check circuit 38 comprises replacing the odd flip-flop 62, the even and odd gates 64 and 66, and the "or" circuit 70 with a two-input "and" gate (not shown) having one input connected to the "1" output of the even flip-flop 60 and the other input connected to the check line 36. The output of the two-input "and" gate of the modified check circuit 38 is connected to the alarm output 39. Thus, the alarm output 39 is relatively low when none or when more than one of the row lines 16 are selected.

Other combinatorial groupings of the monitor cores can be used. For example, the monitor cores can be segregated into two groups with one group including the monitor cores that are linked by array lines having odd-numbered addresses, and the other group including the monitor cores that are linked by array lines having even-numbered addresses.

What is claimed is:

1. In combination with a magnetic core array having a set of array lines for selecting the cores of said array, a monitoring system comprising a plurality of monitor cores each linked by a different array line of said set, said monitor cores each having two states of magnetic remanence, first and second sensing windings each linking a different group of said monitor cores, and a check circuit connected to said sensing windings, said check circuit providing an alarm signal when signals are applied to both said sensing windings at the same time.

2. A monitoring system for use with a magnetic core array having a plurality of array lines for selecting the cores of said array, said monitoring system comprising a plurality of monitor cores each coupled to a different array line, said monitor cores each having two states of magnetic remanence, first and second sensing windings each linking different groups of said monitor cores according to a combinatorial arrangement, and a check circuit having inputs and an output, said sensing windings being coupled respectively to said check circuit inputs, and said check circuit providing an alarm signal on its output when signals are applied to both of said inputs at the same time or to none of said inputs during operation of said magnetic core array.

3. A system for monitoring the operation of a magnetic core array having a plurality of sets of array lines for selecting the cores of said array, said system comprising a separate monitoring circuit connected to each set of said lines, each said monitoring circuit including a plurality of monitor cores each having two remanent states and each linked by a different line of said connected set, first and second sensing windings each linking a digerent group of said monitor cores, and a separate check circuit connected to each separate monitoring circuit, each said check circuit producing an alarm output signal when none or when more than one of said sensing windings of its said connected monitoring circuit have signals induced therein at the same time.

4. A system for monitoring the operation of a magnetic core array having a plurality of sets of array lines for selecting the cores of said array, said system comprising a separate monitoring circuit connected to each set of said lines, each said monitoring circuit including a plurality of monitoring cores each having two remanent states and each linked by a dizerent line of said connected set, and first and second sensing windings each linking half of said monitor cores, said monitor cores being responsive to selecting currents applied to said sets of array lines for producing signals in said sensing windings.

5. In combination with a magnetic core array having a set of array lines for selecting the cores of said array, a monitoring system comprising a plurality of monitor cores each linked by a different array line of said set, said monitor cores each having two remanent states, first and second sensing windings linked to said monitor cores, said first sensing winding linking all those array lines of said set that are identified by address numbers having an even number of binary one digits, said second winding linking all those array lines of said set that are identified by address numbers having an odd number of binary one digits, and a check circuit connected to said sensing windings, said check circuit providing an output when signals are applied to both said sensing windings at the same time.

6. In combination with a magnetic core array having a set of array lines for selecting the cores of said array, a monitoring circuit comprising a plurality of monitor cores each linked by a different array line of said set, said monitor cores each having two remanent states, a pair of sensing windings linked to said monitor cores in combinatorial fashion, and a check circuit connected to said sensing windings, said check circuit including a pair of flip-flop circuits responsive to signals induced in said sensing windings, a pair of "and" gate circuits each connected to both said flip-flop circuits, and means for applying a check signal to said gate circuits.

7. In combination with a magnetic core array having a set of array lines for selecting the cores of said array, a monitoring circuit comprising a plurality of monitor cores each having two remanent states and each being magnetized in an initial one of said states, a pair of sensing windings linked in combinatorial fashion to said monitor cores, signals of one polarity being induced in said sensing windings when said monitor cores are changed from said initial to the other of said states, and signals of the other polarity being induced in said sensing windings when said monitor cores are changed from said other to said initial states, sensing amplifiers connected to said sensing windings and responsive to said other polarity signals, and a check circuit connected to said sensing amplifiers, said check circuit providing an output signal when either none of said sensing windings or when both said sensing windings have said opposite polarity signals induced therein during operation of said array.

8. In combination with a magnetic core array having a set of array lines for selecting the cores of said array, a monitoring circuit comprising a plurality of monitor cores each linked by a different array line of said set, said monitor cores each having two remanant states, a pair of sensing windings each coupled to a different half of said monitor cores, a check circuit coupled to said sensing windings, an alarm flip-flop having two states coupled to said check circuit, means for establishing said alarm flip-flop in one of said states during each cycle of operation of said array, and means for applying a check signal to said check circuit, said check signal being passed by said check circuit to change the state of said alarm flip-flop when one but not both said sensing windings have signals induced therein during operation of said array.

9. In combination with a magnetic core memory having an array of rectangular hysteresis loop cores and having a set of array lines, and having means including said set of array lines for reading and writing information out of and into said array cores, a monitoring circuit comprising a plurality of monitor cores each having two remanent states and each linked by a different one of said array lines, a pair of sensing windings each linked to different groups of said monitor cores, and a check circuit coupled to said sensing windings, said monitor cores being changed from an initial to the other of said states when information is read from said array cores, and from said other to said initial states when information is written into said array cores, and means for applying a check signal to said check circuit, said check signal being blocked by said check circuit when either none or when more than one of said monitor cores are changed from said other to said initial states.

10. In combination with a magnetic core memory having an array of substantially rectangular hysteresis loop cores and having a set of array lines, and having means including said set of array lines for reading and writing information out of said into said array cores, a monitoring circuit as claimed in claim 9, said check circuit including a pair of flip-flop circuits having set and reset inputs and 1 and 0 outputs, said pair of sensing windings being coupled respectively to said set inputs, a pair of three-input "and" gates, said 1 and 0 outputs of said flip-flops being cross-coupled to two inputs of said "and" gates, and said check signal being applied to the third inputs of both said "and" gates.

References Cited in the file of this patent

UNITED STATES PATENTS

| | | |
|---|---|---|
| 2,550,600 | Rehm | Apr. 24, 1951 |
| 2,691,156 | Saltz et al. | Oct. 5, 1954 |
| 2,769,971 | Bashe | Nov. 6, 1956 |

UNITED STATES PATENT OFFICE

CERTIFICATE OF CORRECTION

Patent No. 2,904,781

September 15, 1959

Abraham Katz

It is hereby certified that error appears in the printed specification of the above numbered patent requiring correction and that the said Letters Patent should read as corrected below.

Column 6, line 67, for "digerent" read -- different --; column 7, line 4, for "dizerent" read -- different --.

Signed and sealed this 26th day of April 1960.

(SEAL)
Attest:

KARL H. AXLINE
Attesting Officer

ROBERT C. WATSON
Commissioner of Patents